(12) United States Patent
Hertweck

(10) Patent No.: US 6,434,903 B1
(45) Date of Patent: Aug. 20, 2002

(54) SECTION FIXABLE TO AN ANCHORING BASE

(75) Inventor: Theo Hertweck, Baden-Baden (DE)

(73) Assignee: Profil-Vertrieb GmbH, Gaggenau (DE)

(*) Notice: Subject to any disclaimer, the term of this patent is extended or adjusted under 35 U.S.C. 154(b) by 0 days.

(21) Appl. No.: 10/054,102

(22) Filed: Oct. 22, 2001

Related U.S. Application Data

(62) Division of application No. 09/484,769, filed on Jan. 18, 2000.

(30) Foreign Application Priority Data

Feb. 27, 1999 (DE) .......................... 199 08 585

(51) Int. Cl.$^7$ .............................................. E04B 1/16
(52) U.S. Cl. ........................ 52/334; 52/450; 52/334; 52/335; 52/336; 52/693; 411/85; 428/599
(58) Field of Search .................. 52/693, 334, 336; 411/85, 84; 428/599

(56) References Cited

U.S. PATENT DOCUMENTS

| | | | |
|---|---|---|---|
| 3,812,636 A | * 5/1974 | Albrecht et al. | 52/220.4 |
| 4,675,238 A | * 6/1987 | Karoubas | 428/599 |
| 4,882,889 A | 11/1989 | Healy et al. | |
| 5,417,028 A | * 5/1995 | Meyer | 52/693 |
| 5,491,946 A | 2/1996 | Landis | |
| 5,595,362 A | * 1/1997 | Rinderer et al. | 220/3.9 |

FOREIGN PATENT DOCUMENTS

| | | |
|---|---|---|
| DE | 11 72 479 | 6/1964 |
| EP | 0 072 965 | 3/1983 |
| EP | 0 122 368 | 10/1984 |
| EP | 0 391 764 | 10/1990 |
| GB | 2 181 204 | 4/1987 |

\* cited by examiner

Primary Examiner—Carl D. Friedman
Assistant Examiner—Basil Katcheves
(74) Attorney, Agent, or Firm—Collard & Roe, P.C.

(57) ABSTRACT

A section fixable in a mounted position to an anchoring base by means of fastening screws has at least one fastening segment extending in the mounted position substantially parallel to the anchoring base. The fastening segment is, for example, a fastening flange, which is provided with at least one screw hole for receiving a fastening screw provided with a slot or cross slot as the surface engaged by a screwdriver. A safety (or securing) tab protrudes from the fastening segment at least within the area of the screw hole. When the section is in its mounted position and after the fastening screw has been driven in, the safety tab can be deformed by bending or folding it into its safety or securing position. In this position, the tab grips over the edge of the screw head of the fastening screw and leaves free the surface engaged by the screwdriver. In an alternative embodiment of the section, a spring-elastic safety arrest is used instead of a bendable safety tab. As a fastening screw is being driven in, the safety arrest is pushed away sideways by the head of the screw and, after the fastening screw has been completely driven in, the safety arrest snaps into a safety position in which it grips over the edge of the head of the fastening screw.

5 Claims, 3 Drawing Sheets

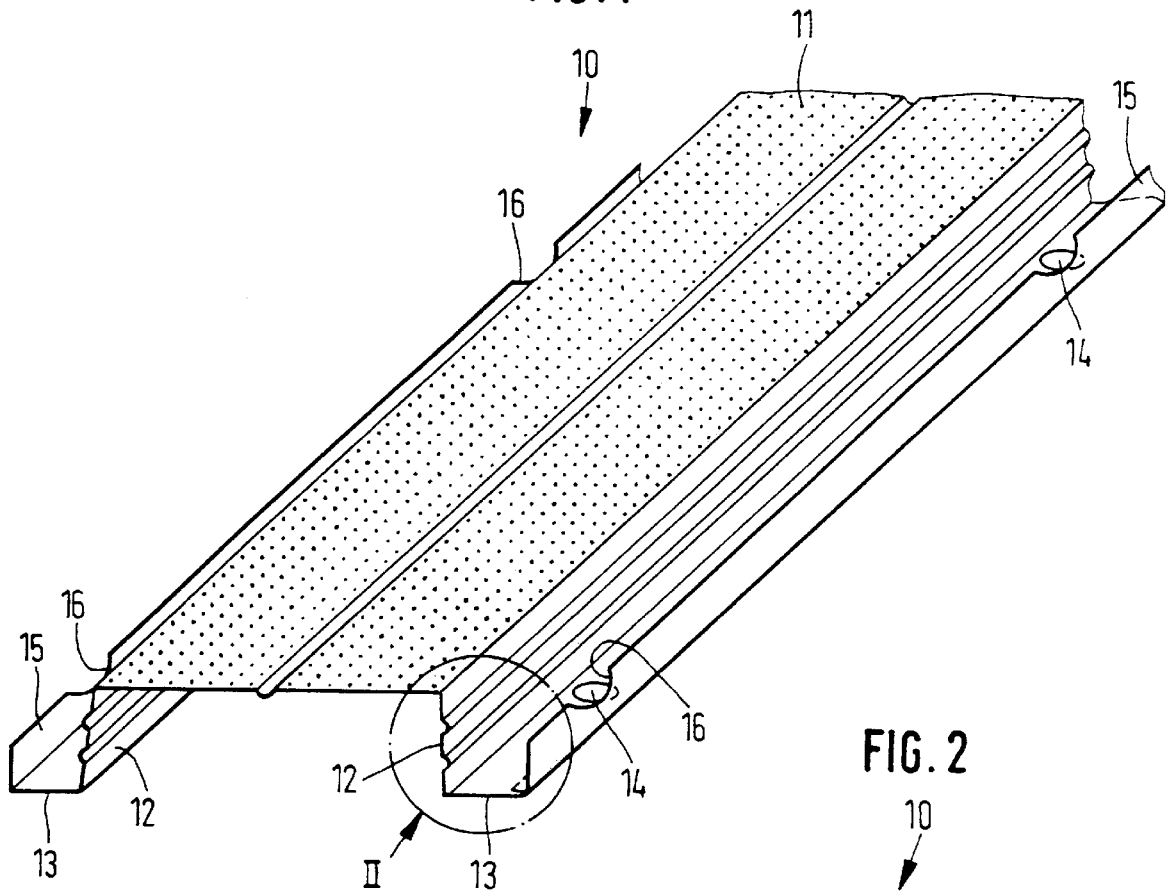
FIG. 1
FIG. 2
FIG. 3
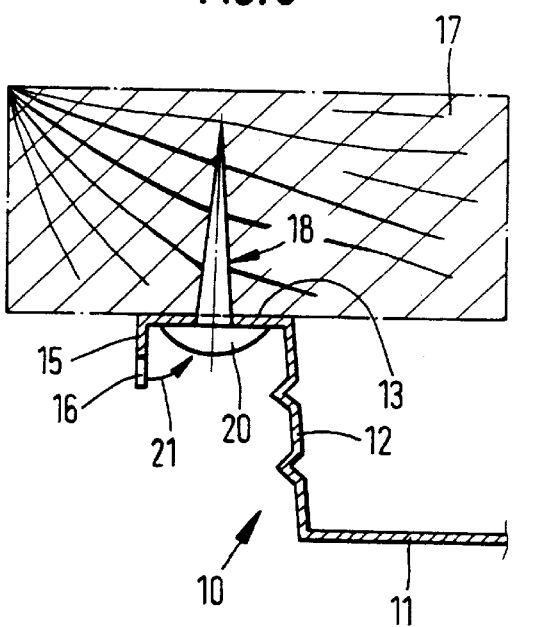

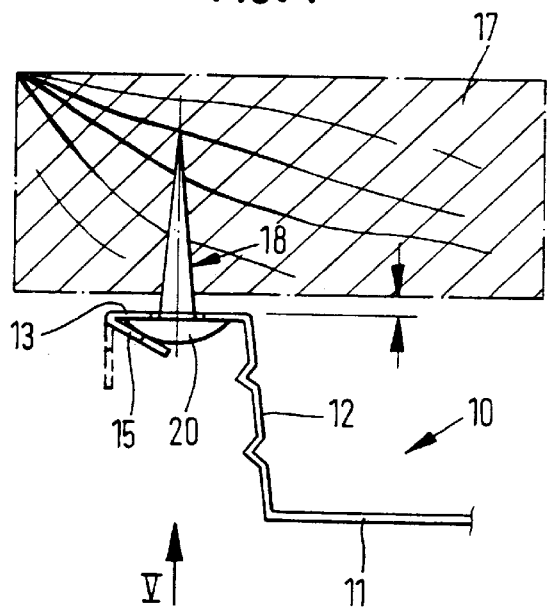
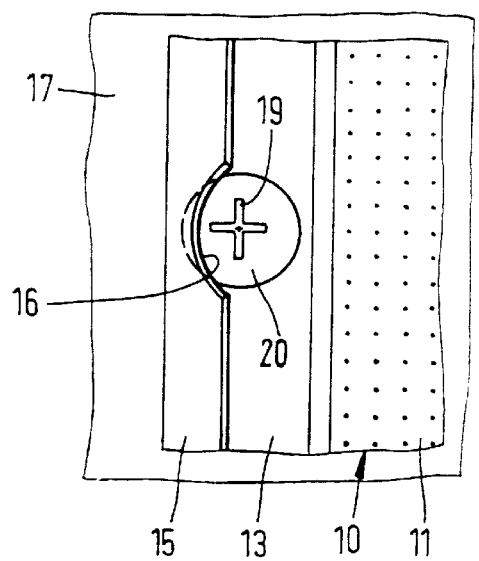
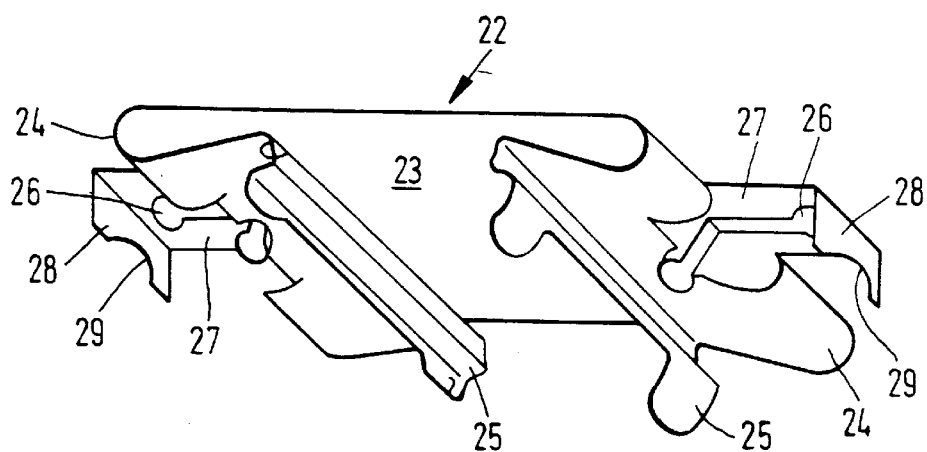
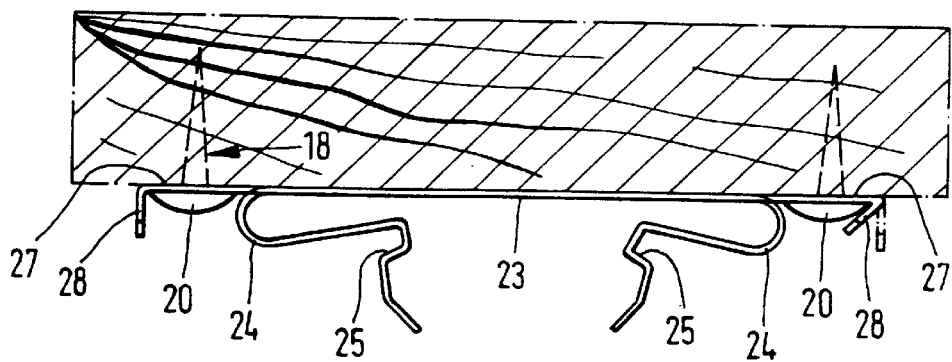

SECTION FIXABLE TO AN ANCHORING BASE

This is a divisional of copending application(s) Ser. No. 09/484,769 filed on Jan. 18, 2000.

BACKGROUND OF THE INVENTION

1. Field of the Invention

The invention concerns a section that can be fixed to an anchoring base by means of fastening screws. The section has at least one fastening segment, which, in the mounted position, extends substantially parallel with the anchoring base. The fastening segment has at least one screw hole for receiving a fastening screw, which can be screwed into the anchoring base, and which has a screw head with a slot or cross slot (Phillips head) for engaging a screwdriver. In the mounted position, the screw head extends over the edge of the screw hole.

The types of section to which the invention relates may be support sections for fastening panels or other covering elements. In addition, the invention may serve as special fastening elements for clipping on C-shaped support sections, which, with their fastening segments pointing upwardly are attached to an anchoring base by means of fastening screws screwed into the anchoring base.

2. The Prior Art

The anchoring base is, as a rule a wood beam-type ceiling, where the sections are screwed to the beams. Especially in connection with older wood beam ceilings, the anchoring base frequently has uneven spots. Such uneven areas were leveled out heretofore by intermediate layers clamped between the wood beams and the fastening segments of the sections. This procedure, however, takes up time during the installation work, and is therefore costly.

Therefore, the problem on which the invention is based consists in improving sections of the type specified above for the aforementioned purpose so that such sections can be mounted in a simple and quick way in their correct positions even if the anchoring base has uneven spots.

SUMMARY OF THE INVENTION

This problem is solved with the section according to the invention in which a safety tab projects from the fastening segment at least in the area of the screw hole. When the section is in its mounted position, after the fastening screw has been screwed into an anchoring base, the safety tab can be deformed into a safety (or securing) position, in which it grips over the edge of the head of the fastening screw, leaving free the surface area of the screw head that is to be engaged by the screwdriver.

Therefore, with the section as defined by the invention, a safety tab is shaped by molding on the fastening segment at least in the area of a screw hole serving the purpose of receiving a fastening screw. This safety tab permits the fastening screw to be screwed in without any obstruction, and then bent or deformed in some other way after the fastening screw has been driven in. When in its securing position, the safety tab grips over the screw head along its edge without covering the area of the screw head that is engaged by the screwdriver.

A section so designed can be mounted on the anchoring base by first driving in the fastening screw or screws until the fastening segment abuts the anchoring base. The raised (or upright) safety tab is then bent into the safety position in which it grips over or covers the screw head along its edge, for example by means of a blow with a hammer. Subsequently, the section can be adjusted by turning back(or slightly loosening again) the fastening screw driven into the anchoring base, i.e. the section can be spaced from the anchoring base for compensating any uneven areas or spots.

According to a further aspect of the invention, the safety tab may be provided with a release element, so that when in the safety or securing position, the edges of such release element grip over the edge of the screw head, leaving free the surface area on the screw head that is engaged by the screwdriver.

Depending on the dimension of the safety tab and the release element, it is possible in accordance with a further aspect for the edges of the release element to grip over the head of a fastening screw not only on a portion of the screwhead edge forming a segment of a circle, but also over a peripheral angle of up to 180°.

According to another aspect of the invention, the section may have a safety tab running along the side of the fastening segment facing away from a center part of the section. The safety tab is raised from the segment into an upright position and can be bent into the safety or securing position. This further aspect is important especially in connection with long-stretching sections.

Such a section may be characterized by being embodied in the form of a long-stretching hat section. This hat section has fastening flanges as fastening segments running or extending along both sides of a center part of the section. The fastening flanges serve as fastening segments with safety flanges raised in upright positions from the segments on its edge sides.

Within the framework of the present invention, however, the section may be characterized also by being designed as a fastening element for mounting U-shaped ceiling support sections, for example by clipping onto such sections. In this section, fastening tabs each penetrated by a screw hole project laterally as fastening segments from opposite sides of a section center part. On the sides facing away from the center part, one of the fastening tabs is raised on each side into a bendable securing position, in which the safety tab grips over:the edge of the screw head.

In an alternative embodiment, the section in accordance with the invention comprises a safety pin having the elasticity of a spring which projects at least on one side from the fastening segment and at least within the area of the screw hole. When the fastening screw is driven in, the safety pin is pushed away sideways by the head of the fastening screw, and, in the mounted position, the pin snaps into the safety or securing position, in which it grips over the edge of the screw head, leaving free the area that is engaged by the screwdriver.

This embodiment has a safety lock with a spring-elastic design. When the fastening screw is driven in, the screw head first hits the projecting safety pin, the safety pin yields sideways under the effect of the force acting on the pin as the fastening screw is being driven in and after the fastening screw has been completely driven in, the safety pin rebounds into a safety position, in which the screw head is engaged on the edge side.

This embodiment permits such sections to be mounted in a particularly simple and quick way because the safety lock is automatically received in its safety position after the fastening screws have been driven in. According to a useful further aspect of this embodiment, the safety lock may comprise a spring leg which projects on the side of the fastening segment facing away from a center part of the section. This arrangement forms an inclined surface ascending towards the fastening segment, whereby the slanted surface is spring-elastically connected with the fastening segment via an approximately C-shaped spring segment.

With this embodiment of the invention, when a fastening screw is driven in, the head of the screw slides up on the slanted surface ascending in the form of a wedge toward the fastening segment, which causes the safety detent pin or lock to be pushed away sideways and to rebound into its securing position, in which it grips over the edge of the screw head, as soon as the screw head has overcome the slanted surface when the fastening screw is driven in.

However, if the section is designed in the form of a long-stretching hat section, with retaining flanges extending lengthwise on both sides as fastening segments, an elastic spring leg extending lengthwise on the outer side may extend also from each of the retaining flanges, or fastening segments. This spring leg is shaped by molding on the respective retaining flange via an about C-shaped spring segment, and the two spring legs may extend from the retaining segments, diverging from each other.

Another alternative has the section designed in the form of a long-extending hat section. Support flanges extend lengthwise in substantially parallel planes on both sides of a fastening segment. Such support flanges are intended for attaching or mounting panels or other flat covering elements. In this embodiment, corrugations are molded as safety locks (or arrests) into section bridges extending between the support flanges and the fastening segment, such corrugations extending lengthwise and, in the mounted condition, gripping over the edge of the head of a screwed-in fastening screw. The corrugations or beads, furthermore, are arranged symmetrically relative to the screw holes, with a spacing from each other amounting to less than the diameter of the head of the fastening screw.

In this embodiment, when a fastening screw is driven in, the screw head slides with its edges onto the corrugations or beads projecting into the section, and spreads the section legs apart as the screw is driven in further, whereupon the section legs rebound into their original position after the screw head has overcome the corrugations or beads.

Another aspect of the invention facilitates the spreading of the section legs provided with the corrugations or beads extending lengthwise. In this aspect, the lengthwise extending corrugations or beads may be limited on the side facing away from the fastening segment by bevels or slants extending in a diverging way, and on the side facing the fastening segment by undercuts of the steps forming section legs.

BRIEF DESCRIPTION OF THE DRAWINGS

Other objects and features of the present invention will become apparent from the following detailed description considered in conjunction with the accompanying drawings. It should be understood, however, that the drawings are for the purposes of illustration only and not as a definition of the limits of the invention.

In the drawings, wherein similar reference characters denote similar elements throughout the several views:

FIG. 1 is a perspective view of a hat-shaped ceiling support section in the overhead position, the section being intended for mounting ceiling panels or similar flat covering elements;

FIG. 2 is an enlarged detail view of the section according to cutout II in FIG. 1;

FIG. 3 is a cutout of a section mounted on a wooden beam as the anchoring base with the help of a fastening screw, the section being fixed to the underside of the beam;

FIG. 4 is a view of a cutout of the mounted section as in FIG. 3, shown in the adjusted condition with a spacing from the anchoring base;

FIG. 5 shows by a cutout a bottom view of the mounted section viewed according to arrow V in FIG. 4;

FIG. 6 is a perspective view of a fastening element for clipping C-shaped ceiling support sections to the underside of the beam;

FIG. 7 shows the fastening element according to FIG. 5 following mounting on the underside of a wooden beam as the anchoring base;

DETAILED DESCRIPTION OF PREFERRED EMBODIMENTS

Figure 8:
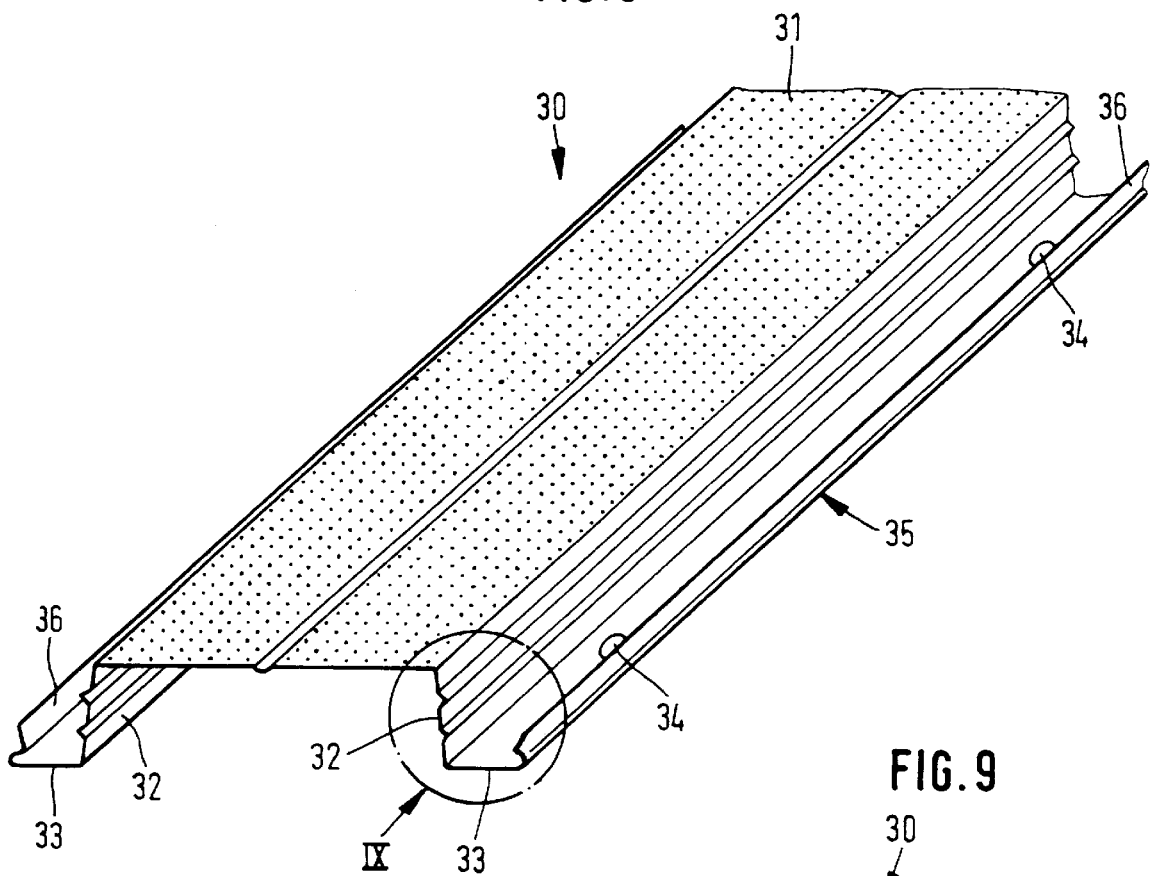
FIG. 8 is a perspective view of a ceiling support section similar to the one of FIG. 1, in the overhead position.

In FIG. 1, the ceiling support section shown in the overhead position is designed in the form of a hat, or hat section, and has a center part 11 designed with a lengthwise extending stiffening corrugation with a fish skin type profiling. Such fish skin profiling makes it easier to drive in self-cutting screws, which, however, is of no further interest in this connection. The two longitudinal sides of the center part 11 are adjoined by section legs 12. Section legs 12 are provided with lengthwise extending stiffening corrugations as well, and adjoin the center part extending in a slightly diverging way relative to one another. Each section leg has outwardly-pointing fastening flanges 13, in which screw holes 14 are arranged, the holes being spaced from each other in the longitudinal direction of the section. Along the outer edges of fastening flanges 13, edge flanges 15 extending from fastening flanges 13 lengthwise are raised upright in the direction of the center part 11. In the area of the screw holes 14 edge flanges 15 are provided with releases 16 in the form of segments of a circle.

When ceiling support sections 10 are employed as intended, they are mounted in the way shown in FIG. 3, i.e., with their center parts 11 pointing downwardly. They are screwed with their fastening flanges 13 to abut anchoring base 17, using fastening screws 18 penetrating screw holes 14. Such an anchoring base may be, for example a wooden beam. Screw head 20 is provided with a cross slot 19 (Phillips screw head) as the surface engaged by the screwdriver. In the fastening process, each screw head 20 grips over or engages the edge of screw hole 14 penetrated by the respective fastening screw 18.

After ceiling support section 10 has been screwed on, edge flanges 15, which are provided with the releases 16 in the area of screw holes 14, can be bent in accordance with arrow 21 (in FIG. 3) into a safety or securing position, for example, by applying a hammer blow to the area of the sections provided with the releases 16. In this position, the edge flanges grip over screw heads 20 of fastening screws 18 along the edge of the screw heads. FIGS. 4 and 5 show an edge flange 15 bent into its securing or safety position, and it is apparent particularly in FIG. 5 that in view of the releases 16, the edge flange 15 bent into its securing position does not cover cross slot 19 in screw head 20. It is possible in this way to adjust the vertical position of the ceiling support section 10 in order to level out any uneven areas or spots of anchoring base 17. The vertical position is adjusted by turning the fastening screw 18 driven into the anchoring base 17 more or less back again, i.e. by slightly unscrewing it again with the consequence that the ceiling support section 10 with its fastening flanges 13 will be lifted and spaced from the anchoring base 17. FIG. 4 shows such a holding arrangement of ceiling support section 10, with fastening flanges 13 spaced from anchoring base 17.

The fastening element 22 shown in FIGS. 6 and 7 is a shaped sheet metal part produced from a single-piece sheet metal cut. In this arrangement, spring bows 24 with retaining tabs 25 for clipping on C-shaped support sections are bent off from a plane center part 23 symmetrically relative to a longitudinal center axis. Spring bows 24 are of no interest here in detail. In the plane of center part 23, a fastening tab 27 provided with a screw hole 26 extends from each of the two sides of center part 23. On the outer edges removed from center part 23, safety or securing tabs 28 are bent off from fastening tabs 27 in the direction of the side pointing toward spring bows 24. Releases 29, which correspond to screw holes 26 of fastening tabs 27, extend from the their free edges into the safety tabs.

When employed as intended, fastening elements 22, in the manner apparent from FIG. 7, are screwed to an anchoring base 17, for example a wooden beam, by means of fastening screws 18 penetrating screw holes 26 in fastening tabs 27, with spring bows 24 projecting downwardly. After fastening tabs 26 have been screwed on, safety tabs 28 are folded as explained above in connection with ceiling support section 10 and FIGS. 1 to 5, so that safety or securing tabs 28, within the area of their releases 29, grip over the edge of the screw head 20 of the respective fastening screw 18 without covering cross slot 19. In FIG. 7, an undeformed safety tab 28 is shown on the left-hand side, whereas safety tab 28 is shown on the right-hand side in its folded or bent securing position, in which it grips over the edge of head 20 of fastening screw 18.

The fastening element 22 shown in FIGS. 6 and 7 is adjustable in the same manner as ceiling support section 10. After fastening element 22 has been screwed to anchoring base 17 and the safety tabs have been subsequently folded into their safety or securing positions, fastening screws 18 are more or less unscrewed again. Center part 23 abutting anchoring base 17 in the representation according to FIG. 7, and fastening tabs 27 laterally projecting from the center part are thereby lifted from anchoring base 17 and maintained in a position spaced from anchoring base 17.

Figure 9:
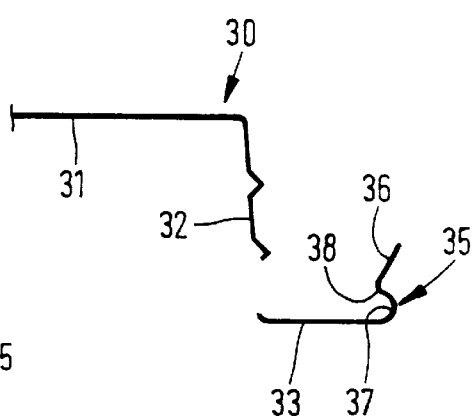
FIG. 9 is an enlarged detail view of the section according to FIG. 8, corresponding with cutout IX in FIG. 8.

The ceiling support section 30 shown in FIGS. 8 and 9 has the same basic structure as ceiling support section 10, and has a center part 31 equipped with a stiffening corrugation extending lengthwise. The center part, furthermore, has a fish skin profiling, which makes it easier to drive in self-cutting screws 18. The longitudinal sides of center part 31 are adjoined by section legs 32, which extend in a slightly diverging way relative to each other, and which are provided with lengthwise extending stiffening corrugations as well. In a plane disposed parallel with center part 31, fastening flanges 33 project laterally from section legs 32 extending diverging relative to each other. The fastening flanges 33 are provided with screw holes 34 and have spring-elastic safety arresting means 35 extending along their outer longitudinal edges. Each safety arrest 35 consists of a spring leg 36 protruding toward the side pointing at center part 31, and a C-shaped spring segment 37 connecting spring leg 36 in each case with the outer lengthwise edge of a fastening flange 33. The spring legs 36 of the safety arrests 35 associated with the two outer longitudinal edges of fastening flanges 33 are set slightly outwardly and extend from the respective fastening flange 33 in a diverging way relative to one another. On the sides of spring legs 36 pointing toward the respective fastening flange 33, undercuts 38 are formed in view of their connection with the outer edges of fastening flanges 33 by means of C-shaped spring segments 37.

Ceiling support sections 30 according to FIGS. 8 and 9 are fixed to an anchoring base 17 in the same way as ceiling support section 10 by screwing ceiling support section 30 to anchoring base 17 using fastening screws 18. Center part 31 points down and fastening flanges 33 abut anchoring base 17. Fastening screws 18 penetrate screw holes 34 arranged in fastening flanges 33, as is shown in FIG. 3 for ceiling support section 10. When fastening screws 18 are driven in, their screw heads 20 come into contact with the slanted surfaces of spring legs 36, which are set slightly sideways. Hence, as fastening screws 18 are driven in further,. spring legs 36 are pushed away outwardly and snap into their safety or securing positions, in which they grip over the edge of screw head 20 of the respective screw 18, as soon as the screw head 20 has overcome the area of transition between the respective spring leg 36 and the adjoining C-shaped spring segment 37.

After it has been screwed to an anchoring base 17, the ceiling support section 30 according to FIGS. 8 and 9 is adjustable as well for leveling out any uneven spots on anchoring base 17. This is accomplished by unscrewing fastening screws 18 again as far as needed, whereby the edge of screw head 20 of fastening screw 18 engaged by undercut 38 takes or drives the ceiling section along with it, and thereby lifts the ceiling section from anchoring base 17 by a measure corresponding with the extent to which fastening screws 18 are driven back or unscrewed again.

Figure 10:
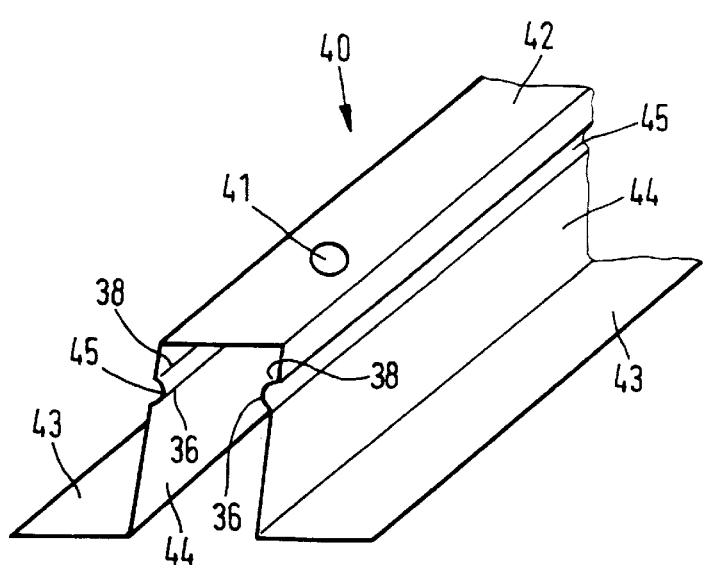
FIG. 10 is a perspective view of another hat-shaped ceiling support section.

The ceiling support section 40 shown in FIG. 10 is designed hat-shaped as well. Section 40 has a center part 42 provided with screw holes 41, as well as two support flanges 43 extending outwardly in planes parallel with the center part. Panels or other flat covering elements can be fixed to the support flanges in a manner not of interest in this connection in detail. Two section legs 44 extending approximately parallel with one another extend between support flanges 43 and center part 42. The lengthwise extending corrugations 45 serving as safety arrests are molded into section legs 44 with a spacing from the center part corresponding with the thickness of the screw heads 20 of the fastening screws 18 to be employed. The corrugations project into the hollow space of the section formed by the two section legs 44. On the side pointing to center part 42 as the fastening segment, the longitudinal corrugations 45 are limited by steps 38 forming undercuts, and slanted surfaces 36 adjoining the steps, or undercuts. Slanted surfaces 36 extend in a diverging way relative to one another toward support flanges 43.

When employed as intended, the ceiling support section 40 according to FIG. 10 is screwed to anchoring base 17 by means of fastening screws 18 penetrating screw holes 41, with its center part 42 abutting anchoring base 17. As fastening screws 18 are driven in, their screw heads 20 come into contact with the slanted surfaces 36 of safety arrests designed in the form of lengthwise extending corrugations 45. Hence as fastening screws 18 are screwed in further, section legs 44 are spread apart and, as soon as screw heads 20 have overcome slanted surfaces 36 of the safety arrests, they rebound into their original positions, with the consequence that steps 38 of the safety arrests forming the undercuts grip over the edge of screw heads 20.

After fastening screws 18 have been driven in and safety arrests 45 have snapped into their safety or securing positions, the section can be adjusted for leveling out any uneven spots on anchoring base 17 as well by unscrewing again fastening screws 18 by a measure leveling out such uneven areas, whereby the screw heads 20 engaged on their edges by the safety arrests 45 drive the section along, and center part 41 of the section is lifted from anchoring base 17 by a measure corresponding with the extent to which fastening screws 18 are turned back again.

While a few embodiments of the present invention have been shown and described, it is to be understood that many changes and modifications may be made thereunto without departing from the spirit and scope of the invention as defined in the appended claims.

What is claimed is:

1. A section fixable in a mounted position to an anchoring base by means of fastening, screws having a screw head with a slotted surface for engaging a screwdriver comprising of:
    at least one fastening segment adapted to extend substantially parallel to the anchoring base in the mounted position,
    at least one screw hole disposed in said fastening segment for receiving a fastening screw driven into an installed position in the anchoring base whereby the screw head grips over an edge of the screw hole,
    a safety arrest having a spring elasticity projecting on at least one side from the fastening segment at least in the area of the screw hole, said safety arrest being pushed away sideways by the screw head when the fastening screw is driven into the installed position, said safety arrest when the section is in the mounted position snapping into a safety position in which said safety arrest grips over an edge of the screw head and leaves free the surface engaged by the screwdriver.

2. The section according to claim 1, wherein the section comprises a center part and the safety arrest comprises a spring leg projecting from the side of the fastening segment facing away from the center part to form a slanted surface ascending toward the fastening segment, said spring leg being spring-elastically connected with the fastening segment via an approximately C-shaped spring segment.

3. The section according to claim 2 comprising a long-stretching hat section, two fastening segments and two spring legs, said fastening segments comprising retaining flanges extending lengthwise on each side of said section, said spring elements extending lengthwise on the other side of each retaining flange and projecting from each side of said section in the form of an approximately C-shaped spring segment, said spring legs diverging from each other.

4. The section according to claim 1 comprising a long-stretching hat section having a fastening segment, a support flange extending lengthwise on each side of the fastening segment, a section bridge connecting each support flange with a respective side of the fastening segment and a plurality of safety arrests, said support flanges extending in planes substantially parallel to the fastening segment and adapted for mounting flat covering elements, said safety arrests comprising lengthwise extending corrugations molded into the safety bridges extending between the support flanges and the fastening segment, said safety corrugations gripping over the edge of the screw head of an installed fastening screw in the installed position.

5. The section according to claim 4, wherein the lengthwise extending corrugations are limited toward the side pointing away from the fastening segment by slanted surfaces diverging from each other, and on the side pointing to the fastening segment by steps forming undercuts of the section bridges.

* * * * *

UNITED STATES PATENT AND TRADEMARK OFFICE
CERTIFICATE OF CORRECTION

PATENT NO.      : 6,434,903 B1
DATED           : August 20, 2002
INVENTOR(S)     : Theo Hertweck It is certified that error appears in the above-identified patent and that said Letters Patent is hereby corrected as shown below:

Column 7,
Line 16, after the word "fastening", please delete the ",".

Signed and Sealed this

Fifth Day of August, 2003

JAMES E. ROGAN
*Director of the United States Patent and Trademark Office*